United States Patent [19]

Amemiya et al.

[11] 4,041,223
[45] Aug. 9, 1977

[54] PROCESS FOR PREPARING HYDROLYZED ETHYLENE-VINYL ACETATE COPOLYMER HAVING IMPROVED HEAT STABILITY

[75] Inventors: Kiyosi Amemiya, Ibaraki; Hiroshi Takida, both of Takatsuki, Japan

[73] Assignee: Nippon Gohsei Kagaku Kogyo Kabushiki Kaisha, Osaka, Japan

[21] Appl. No.: 608,020

[22] Filed: Aug. 26, 1975

[30] Foreign Application Priority Data

Aug. 30, 1974  Japan .................. 49-100279
Sept. 5, 1974  Japan .................. 49-103380

[51] Int. Cl.² ........................... C08F 8/12
[52] U.S. Cl. ........................... 526/10; 526/8; 526/11; 260/45.7 P
[58] Field of Search ............ 450/604.5; 260/87.3, 260/91.3 PV, 91.3 VA, 45.7 P; 526/10, 11, 45.7 P

[56] References Cited

U.S. PATENT DOCUMENTS

| 3,156,667 | 11/1964 | Martins | 260/45.7 |
| 3,262,905 | 7/1966 | Martins | 260/45.7 |

FOREIGN PATENT DOCUMENTS

| 4,628,416 | 8/1971 | Japan | 450/604.5 |
| 634,140 | 3/1950 | United Kingdom | 450/604.5 |

*Primary Examiner*—Stanford M. Levin
*Attorney, Agent, or Firm*—Armstrong, Nikaido & Marmelstein

[57] ABSTRACT

Process for preparing hydrolyzed ethylene-vinyl acetate copolymers, whose ethylene content is 20 to 50% by mole and degree of hydrolysis in vinyl acetate units is more than 90% by mole, having improved heat stability, which comprises, after hydrolyzing ethylene-vinyl acetate copolymer in an alcoholic or water medium in the presence of alkaline catalyst, contacting particles of the hydrolyzed copolymer with phosphoric acid such as orthophosphoric acid, phosphorous acid and pyrophosphoric acid to incorporate the phosphoric acid into the hydrolyzed copolymer in an amount of 0.001 to 0.5% by weight of phosphate radical calculated as —PO₄ radical, to the dry weight of the hydrolyzed copolymer, and of not less than equal amount by weight to alkali metal ion remaining in the hydrolyzed copolymer.

6 Claims, No Drawings

PROCESS FOR PREPARING HYDROLYZED ETHYLENE-VINYL ACETATE COPOLYMER HAVING IMPROVED HEAT STABILITY

BACKGROUND OF THE INVENTION

The present invention relates to a process for preparing hydrolyzed ethylene-vinyl acetate copolymers having improved heat stability.

Hydrolyzed ethylene-vinyl acetate copolymers essentially possess advantageous characteristics such as antistatic property, rigidness, abrasion-resistance, resistances against oils and solvents, little shrinkage in molding procedure, mechanical strength, surface gloss when molded, and high resistance to oxygen permeability and, therefore, it is expected for use as engineering plastics and wrapping or packaging materials.

In general, the hydrolyzed ethylene-vinly acetate copolymers are prepared by hydrolyzing an ethylene-vinyl acetate copolymer in a medium in the presence of an alkaline catalyst such as hydroxides of alkali metals or methoxides of alkali metals, neutralizing a catalyst by means of an acid such as acetic acid if required, and recovering the hydrolyzed copolymer. However, when the hydrolyzed copolymer so prepared is melt-molded by a molding machine such as an injection molding machine, it is very difficult to continue the molding for a long period of time because the heat stability of the hydrolyzed copolymer is not necessarily sufficient, and also the discoloring and foaming are observed on the obtained molded article. Further, when the hydrolyzed copolymer is re-molded after once molded, the foaming resulting from generation of gases by thermal decomposition of the copolymer and noticeable discoloring are inevitable. In order to improve the heat stability, it has been tried to incorporate various additives into the hydrolyzed copolymer, but no satisfactory additive or means has been found.

OBJECTS OF THE INVENTION

It is an object of the present invention to provide hydrolyzed ethylene-vinyl acetate copolymers having improved heat stability.

A further object of the invention is to provide a process for preparing hydrolyzed ethylene-vinyl acetate copolymers having improved heat stability.

These and other objects of the invention will become apparent from the description hereinafter.

DETAILED DESCRIPTION

It has now been found that the above-mentioned objects can be attained by, after hydrolyzing an ethylenevinyl acetate copolymer in an alcoholic or water medium in the presence of an alkaline catalyst, contacting particles of the hydrolyzed ethylene-vinyl acetate copolymer with a phosphoric acid such as orthophosphoric acid, phosphorous acid or pyrophosphoric acid to incorporate a phosphoric acid into the hydrolyzed copolymer in an amount of from 0.001 to 0.5% by weight of a phosphate radical calculated as —$PO_4$ radical, to the dry weight of the hydrolyzed copolymer, and of not less than equal amount of weight to a residual alkali metal ion in the particles of hydrolyzed copolymer, which is derived from the alkaline catalyst used in the hydrolysis.

The hydrolyzed ethylene-vinyl acetate copolymers prepared according to the present invention have improved heat stability. Therefore, the flow property of the hydrolyzed copolymer in melt-molding is favorable and the molding for a long period of time can be made without any trouble, and moreover the molded articles obtained are not discolored and have smooth surface. Also re-molding of the hydrolyzed copolymer molded once can be made without discoloring. Further, when the hydrolyzed copolymers are molded in a form of film or sheet, there is no discoloring and foaming, and generation of fish eyes can be inhibited.

The hydrolyzed ethylene-vinyl acetate copolymers prepared in the present invention have an ethylene content of from 20 to 50% by mole. The hydrolyzed ethylene-vinyl acetate copolymers having an ethylene content outside the above range are not adequate for the use of molding materials because they are poor in properties of mechanical strength, rigidness, water-resistance, antistatic property and oxygen permeability. The copolymers containing a small amount of another monomer unit copolymerized with ethylene and vinyl acetate, such as propylene, isobutylene, crotonic acid, acrylic acid, methacrylic acid, maleic acid and alkyl esters thereof, may also be usable in the invention.

The ethylene-vinyl acetate copolymer having an ethylene content of from 20 to 50% by mole is hydrolyzed generally in an alcoholic medium in the presence of an alkaline catalyst such as sodium hydroxide, potassium hydroxide or sodium methoxide to produce the hydrolyzed ethylene-vinyl acetae copolymer having a degree of hydrolysis in vinyl acetate units of more than 90% by mole. As the alcoholic medium, lower alkyl alcohols, such as methanol, ethanol, propanol, isopropanol, n-nbutanol, tert-butanol, are employed, but methanol is the most preferable. The hydrolysis is carried out in methanol in the presence of about 30 to 250 millimoles o the alkaline catalyst per mole of acetate group of the ethylene-vinyl acetate copolymer at a temperature of about 20° to 65° C.

When the hydrolysis is carried out in an alcohol, the hydrolysis proceeds in a form of solution and with the progress of the hydrolysis reaction, the partially hydrolyzed copolymer precipitates. The reaction mixture is obtained in a form of slurry or paste. The precipitation of the hydrolyzed copolymer may be completed by cooling the slurry or paste, or by adding a non-solvent to the slurry or paste. After the completion of the hydrolysis, an acid such as acetic acid, orthophosphoric acid, phosphorous acid or pyrophosphoric acid may be added to the reaction mixture to neugralize the residual alkali. The neutralization treatment is effective for preventing the continuance of slow hydrolysis reaction which may cause lowering of flow property upon molding due to production of the hydrolyzed copolymer having a degree of hydrolysis extending to wide range. The phosphoric acids are preferably employed in the neutralization in point of discoloring, transparency and surface smoothness of molded articles. The hydrolyzed copolymer is then separated from the reaction mixture by means of filtration or centrifugation.

The hydrolyzed copolymer having a degree of hydrolysis of more than 90% by mole, particularly 90 to 97% by mole, can be easily obtained by the process mentioned above.

The hydrolyzed copolymer prepared in the present invention should have a degree of hydrolysis of more than 90% by mole. When the degree of hydrolysis of the copolymer is less than 90% by mole, not only the physical properties are inferior, but also deacetylation takes place during melt-molding, and it causes the lowering of the flow property and the corrosion of a mold.

Furthermore, the hydrolyzed copolymers having a degree of hydrolysis of not less than 97% by mole can provide molded articles especially excellent in moisture-and water-resistances, dimensional stability and mechanical strength.

For obtaining such a highly hydrolyzed copolymer, the above-mentioned process, i.e. hydrolysis in an alcoholic medium, is not practical. Because the hydrolysis of ethylene-vinyl acetate copolymer to the extent of more than 97% by mole in an alcoholic medium requires long term and large quantities of alkaline catalyst and, as a result, a large quantities of alkali salt is incorporated in the particles of the hydrolyzed copolymer, which causes discoloration of the copolymer. To avoid such disadvantages, it is preferable to employ two state hydrolysis, i.e. primry hydrolysis in an alcoholic medium until a degree of hydrolysis reaches the range of 90 to 97% by mole, and then secondary hydrolysis in a water medium to a degree of hydrolysis of more than 97% by mole.

The secondary hydrolysis is usually carried out in a form of slurry in an aqueous medium in the presence of 1 to 5 moles of the alkaline catalyst per mole of the residual acetate group of the partially hydrolyzed copolymer at a temperature of 40° to 80° C. In the process of the secondary hydrolysis, the presence of the copolymer particles having a particle size of more than 2,000 μ tends to make the hydrolysis reaction ununiform, and as a result, the distribution of the degree of hydrolysis becomes wide and the hydrolyzed copolymer having favorable properties is hard to obtain. Therefore, it is preferable to use partially hydrolyzed copolymer having a particle size of less than 2,000 μ. The particles more than 2,000 μ are removed by sieve or are ground to less than 2,000 μ. The most preferable particle size is selected from 680 to 53 μ (10 to 280 mesh). Moreover, in the process of the secondary hydrolysis, it is preferable to remove the alcohol contained in the copolymer particles to the extent of not more than 15% by weight. When the particles of partially hydrolyzed copolymer containing alcohol more than 15% by weight is used in the process of the secondary hydrolysis, a part of the particles is dissolved in a mixture of alcohol and water. This may cause poor recovery of the particles of fully hydrolyzed copolymer and also agglomeration of particles during the secondary hydrolysis. The agglomeration makes the hydrolysis reaction ununiform and requires a large quantity of the alkaline catalyst, and as a result, molding property and heat stability of the obtained hydrolyzed copolymer are impaired. After the completion of the hydrolysis, the acid may be added to the reaction mixture to neutralize the alkali as occasion demands, and the hydrolyzed copolymer is separated by means of filtration or centrifugation.

In the particles of the hydrolyzed copolymer thus obtained, a comparatively large quantity of an alkali metal salt derived from the catalyst remains and it may cause the lowering of heat stability of the copolymer. To remove the alkali and alkali metal salt, the particles of hydrolyzed copolymer are sufficiently washed with water or an organic solvent such as methanol. For instance, there may be applied a way of (a) washing the particles with water or the organjc solvent one or more times after separating them from the hydrolysis reaction mixture by filtration or centrifugation, or (b) diluting the reaction mixture with water or the organic solvent, separating the hydrolyzed copolymer and optionally washing the separated copolymer. In the present invention, it is preferable to remove the alkli metal salt included in the hydolyzed copolymer to not more than 1.5% by weight based on the dry weight of the hydrolyzed copolymer. When more than 1.5% by weight of the alkali metal salt remains in the hydrolyzed copolymer, the obtained hydrolyzed copolymer is liable to be partially decomposed upon melt-molding and causes trouble such as generation of small or discoloration even if the hydrolyzed copolymer is treated with a phosphoric acid in the next step.

After removing the alkali metal salt, the particles of hydrolyzed copolymer are contacted with the phosphoric acid in water or an organic solvent such as methanol in a form of slurry. The phosphoric acid employed in the present invention is selected from the group consisting of orthophosphoric acid, phosphorous acid and pyrophosphoric acid. The slurry is agaitated sufficiently, Usually, water or the organic solvent is employed in an amount of more than 3 times the dry weight of the hydrolyzed copolymer, and the amount of the phosphoric acid in water or organic solvent is selected from about 0.1 to about 3.6% by weight based on the dry weight of the hydrolyzed copolymer.

Only specific phosphoric acids can bring about favorable effects to the molding property of the hydrolyzed copolymer and the properties of molded articles. The heat stability can not be improved by an acid other than the phosphoric acids, for instance, inorganic acids such as sulfuric acid and hydrochloric acid and organic acids such as acetic acid, oxalic acid and citric acid. Judging from such a fact, it is assumed that not only the phosphoric acids act as an acid, but also there may be function peculiar to the phophoric acids.

The hydrolyzed copolymer so treated is separated from the slurry by means of filtration or centrifugation, and then dried after optionally washing the separated copolymer with water or the organic solvent.

In the present invention, it is essential that the particles of hydrolyzed ethylene-vinyl acetate copolymer contains the phosphoric acid in an amount of from 0.001 to 0.5% by weight of phosphate radical calculated at $-PO_4$ radical to the dry weight of the hydrolyzed copolymer and of not less than equal amount by weight to a residual alkali metal ion in the particles of hydrolyzed copolymer. When the amount of the residual phosphate radical is less than 0.001% by weight or more than 0.5% by weight, the hydrolyzed copolymer is discolored or gives out smell, or the foaming takes place, owing to heat decomposition upon melt-molding the hydrolyzed copolymer. This tendency is noticeable when long run molding is carried out. Also when the amount of the phosphate radical is less than the amount of the residual alkali metal ion in the particles of hydrolyzed copolymer, the heat decomposition upon melt-molding can not be prevented and the foaming and discoloration of molded articles are observed even if the amount of the residual phosphate radical falls within the above range.

The hydrolyzed copolymers obtained in accordance with the present invention possess improved heat stability and, therefore, the molding property of the hydrolyzed copolymer and properties of molded articles are very favorable. The hydrolyzed copolymers of the invention are very useful for an application as engineering plastics, wrapping or packaging materials, or the like.

The present invention is more particularly described and explained by means of the following illustrative Examples, in which all parts and percentages are by weight unless otherwise described.

In the following Examples and Comparative Examples, the determination of Sodium acetate, phosphate radical and sodium ion were made as follows:

The sodium acetate was determined by means of the neutralization titration method.

The orthophosphate radical was determined by extracting salts with a hot diluted sulfuric acid from a sample, and subjecting the resulting extract to the determination of $PO_4^{3-}$ ion by means of the absorptiometric method (employing molybdenum blue) according to JIS K 0102. With respect to the phosphate radicals other than orthophosphate radical, a phosphate ion such as $PHO_3^{2-}$ or $P_2O_7^{4-}$ ion in the extract was oxidized to $PO_4^{3-}$ ion by adding nitric acid or potassium perchlorate to the extract and the $PO_4^{3-}$ ion was determined in the same manner as above.

The sodium ion was determined by means of the flame spectrophotometry.

EXAMPLE 1

To 100 parts of a 40% methanol solution of ethylene-vinyl acetate copolymer having an ethylene content of 30% by mole, 10 parts of a 10% methanol solution of sodium hydroxide was added, and hydrolysis reaction was carried out at a temperatue of 40° C. for 3 hours with agitation. In the course of the hydrolysis reaction, the reaction mixture in a form of paste became cloudy and finally a viscous slurry was obtained. After adding acetic acid to the slurry to neutralize sodium hydroxide, 60 part of methyl acetate was added to the slurry to complete the precipitation of particles of the hydrolyzed copolymer. The particles were then filtered and dried. Degree of hydrolysis in vinyl acetate unit of the hydrolyzed copolymer so prepared was 96.0% by mole.

A hundred parts of the particles so obtained were added to 500 parts of a 1% aqueous solution of sodium hydroxide, and further hydrolyzed at a temperature of 65° C. for 3 hours with agitation. After neutralizing the resulting reaction mixture with acetic acid, the particles were separated by filtration. The separated particles were then washed by adding the particles to 500 parts of water, agitating at a room temperature for one hour and filtering the particles. This washing procedure was repeated twice. Amount of salts remaining in the particle was 0.2% calculated as sodium acetate based on the dry weight of the particle.

To the particles so obtained was added water in an amount by weight of 10 times the particle to form a slurry, and orthophosphoric acid was added to the slurry in an amount of 0.4% based on the dry weight of the particle. The slurry was then agitated at a room temperature for 4 hours to treat the particles with orthophosphoric acid.

After the completion of the phosphoric acid treatment, the particles were filtered and sufficiently dried in hot air. The orthophosphate radical content of the particle so obtained was 0.04%, and the weight ratio of the phosphate radical to the sodium ion remaining in the particle was 5.6. Also, degree of hydrolysis of the hydrolyzed copolymer so prepared was 99.2% by mole.

The hydrolyzed copolymer so prepared was molded to give test pieces by means of the injection molding under the following condition.

Machine: Injection molding machine of 3.5 oz.avdp. made by NISSEI PLASTIC INDUSTRIAL CO., LTD.
Nozzle temperature: 210° C.
Cylinder temperature at the front part: 230° C.
Cylinder temperature at the rear part: 180° C.
Mold temperature: 60° C.
Injection pressure: 900 kg./cm.$^2$
Injection speed: 2.5 ml./mm.$^2$/sec.
Injection time: 7 sec.
Cooling time: 25 sec.

Appearance and mechanical properties of the test pieces so obtained were as follows:

Appearance
  Discloration: None
  Transparency: Very excellent
  Surface smoothness: Very excellent
Mechanical properties
  Tensile strength (ASTM D 638): 915 kg./cm.$^2$
  Flexural strength (ASTM D 790): 1,230 kg./cm.$^2$
  Charpy impact strength (ASTM D 256): 7.5 kg.cm./cm.

Long run molding for 80 hours was carried out, but there was no trouble.

Comparative Examples 1 to 3

Hydrolyzed ethylene-vinyl acetate copolymers were prepared in the same manner as in Example 1 except that the phosphoric acid treatment was not carried out (Comparative Example 1), and that the phosphoric acid treatment was carried out by adding the particles to 5 times by weight the particles of water to form slurry and adding orthophosphoric acid to the slurry in an amount of 5% based on the dry weight of the particle (the orthophosphate radical content of end product: 1.0%, the weight ratio of the phosphate radical to the sodium ion: 100) (Comparative Example 2), and that the particles separated after the secondary hydrolysis (which contained 2.0% of sodium acetate) was added to 2times by weight the particle of water without washing with water and the phosphoric acid treatment was carried out in the presence of 0.05% of orthophosphoric acid based on the dry weight of the particle (the orthophosphate radical content of end product: 0.025%, the weight ratio of the phosphate radical to sodium ion: 0.089) (Comparative Example 3).

The results are shown in the following Table.

|  | Com. Ex. 1 | Com. Ex. 2 | Com. Ex. 3 |
| --- | --- | --- | --- |
| Discoloration | Brown | Yellowish brown | Yellowish brown |
| Transparency | Rather bad | Passable | Bad |
| Surface smoothness | Rather bad | Bad(non-melted material exists) | Passable |
| Long run molding | Impossible (decomposition) | Impossible (noticeable increase of viscosity) | Impossible (decomposition |

EXAMPLE 2

Ethylene-vinyl acetate copolymer having an ethylene content of 35% by mole was hydrolyzed in two stages in the same manner as in Example 1 except that after the secondary hydrolysis, the washing of the hydrolyzed copolymer was carried out by adding 500 parts of water to the resulting reaction mixture, followed by the neutralization with acetic acid and filtration. Degree of hydrolysis of the hydrolyzed copolymer obtained by the primary hydrolysis was 96.0% by mole, and that of the hydrolyzed copolymer obtained by the secondary hydrolysis was 99.0% by mole. The hydrolyzed copolymer so obtained contained 1.3% of salts calculated as sodium acetate.

The hydrolyzed copolymer was then treated with phosphorous acid in an amount of 2.0%, based on the dry weight of the particle, in 10 times the particles of water.

After the completion of the phosphoric acid treatment, the particles were filtered and dried. The phosphite radical content of the particle so obtained was 0.24% calculated as —PO$_4$ radical, and the weight ratio of the phosphate radical to the sodium ion was 6.6.

The hydrolyzed copolymer so prepared was molded by means of the injection molding in the same manner as in Example 1. The results were favorable as shown below.
Discoloration: None
Transparency: Very excellent
Surface smoothness: Excellent
Long run molding for 50 hours was carried out, but there was no trouble.

EXAMPLE 3

After hydrolysis of ethylene-vinyl acetate copolymer having an ethylene content of 25% by mole in a form of methanol solution in the presence of sodium hydroxide with heating, acetic acid was added to the resulting reaction mixture to neutralize and then methyl acetate was added to complete the precipitation of the particle of hydrolyzed copolymer. After filtering the particles, the particles were again put in methanol in an amount of 5 times by weight the particle and were agitated at a room temperature for one hour. Then the particles were recovered by filtration. The hydrolyzed copolymer so obtained had a degree of hydrolysis of 95.0% by mole, and contained 0.70% of salts calculated as sodium acetate.

The particles were then added to methanol in an amount by weight of 5 times the particle to form a slurry and after adding orthophosphoric acid in an amount of 1.0% based on the dry weight of the particle to the slurry, the phosphoric acid treatment was carried out with agitation. The particles so treated were separated from the methanol slurry by filtration and then dried. The orthophosphate radical content of the particle was 0.20%, and the weight ratio of the phosphate radical to the sodium ion was 5.0.

The hydrolyzed copolymer so prepared was molded by means of the injection molding. The results were favorable as shown below.
Discoloration: None
Transparency: Very excellent
Surface smoothness: Excellent
Long run molding for 100 hours was carried out, but there was no trouble.

EXAMPLE 4

Particles of the hydrolyzed ethylene-vinyl acetate copolymer were obtained in the same manner as in Example 1 except that after the primary hydrolysis in methanol, particles having a particle size more than 10 mesh (6% of whole particles) were removed by passing through a sieve and that the slurry obtained by the secondary hydrolysis was neutralized by adding 8.5 parts of a 85% aqueous solution of orthophosphoric acid to the slurry instead of acetic acid.

The obtained particles were mixed with water in an amount by weight of 10 times the particle to form a slurry, and to the slurry orthophosphoric acid was added in an amount of 0.14% based on the dry weight of the particle. The slurry was then agitated at a room temperature for 4 hours to treat the particles with orthophosphoric acid.

After the completion of the phosphoric acid treatment, the particles were filtered and sufficiently dried in hot air. The orthophosphate radical content of the particle so obtained was 0.016%, and the weight ratio of the phosphate radical to the sodium ion remaining in the particle was 4.0. Also, degree of hydrolysis of the hydrolyzed copolymer was 99.2% by mole.

The hydrolyzed copolymer so prepared was molded by means of the injection molding under the same conditions as in Example 1. The results are shown below.
Appearance
  Discoloration: None
  Transparency: Very excellent
  Surface smoothness: Very excellent
Mechanical properties
  Tensile strength (ASTM D 638): 930 kg./cm.$^2$
  Flexural strength (ASTM D 790): 1,280 kg./cm.$^2$
  Charpy impact strength (ASTM D 256): 7.7 kg.cm./cm.
Long run molding for 80 hours was carried out, but there was no trouble.

EXAMPLE 5

To 500 parts of a 10% aqueous solution of sodium hydroxide, 100 parts of particles of partially hydrolyzed ethylene-vinyl acetate copolymer (Ethylene content: 35% by mole, Degree of hydrolysis in vinyl acetate unit: 96% by mole) having an average particle size of 350 μ (and not having a particle size of more than 2,000 μ) was added, and the hydrolysis reaction was carried out at a temperature of 65° C. for 3 hours with agitation. After the completion of the hydrolysis, 6.1 parts of phosphorous acid was added to the resulting slurry to neutralize, and the particles were separated from the slurry by filtration.

The wet particles so obtained were added to water in an amount by weight of 10 times the particle to form a slurry, and phosphorous acid was added to the slurry in an amount of 1.0% based on the dry weight of the particle. The slurry was then agitated at a room temperature for 4 hours. After the completion of the phosphoric acid treatment, the particles were spearated by filtration and sufficiently dried in hot air. The phosphite radical content of the particle so obtained was 0.12% calculated as —PO$_4$ radical, and the weight ratio of the phosphate radical to the residual sodium was 5.4. Also, degree of hydrolysis of the hydrolyzed copolymer was 99.0% by mole.

The hydrolyzed copolymer so prepared was molded in the same manner as in Example 1. The results were favorable as shown below.
Discoloration: None
Transparency: Very excellent
Surface smoothness: Excellent
Long run molding for 50 hours was carried out, but there was no trouble.

EXAMPLE 6

To 500 parts of a 1.5% aqueous solution of sodium hydroxide, 100 parts of particles of partially hydrolyzed ethylene-vinyl acetate copolymer (Ethylene content:

25% by mole, Degree of hydrolysis in vinyl acetate unit: 95.0% by mole) having an average particle size of 250 μ (and not having a particle size of more than 2,000 μ) was added, and the hydrolysis reaction was carried out at a temperature of 60° C. for 5 hours with agitation. After the completion of the hydrolysis, 10 parts of orthophosphoric acid was added to the resulting slurry to neutralize, and the particles were separated from the slurry by filtration. The separated particles were then added to 500 parts of water, and agitated at a room temperature for one hour to wash the particles.

After separating the particles by filtration, to the wet particles was added water in an amount of 10times the particles to form a slurry. To the slurry orthophosphoric acid was added in an amount of 0.8% based on the dry weight of the particle, and the phosphoric acid treatment was carried out with agitation at a room temperature for 2 hours. The treated particles were then separated by filtration and dried sufficiently in hot air.

The orthophosphate radical content of the hydrolyzed copolymer so obtained was 0.12%, and the weight ratio of the phosphate radical to the sodium ion was 5.5. Also, degree of hydrolysis of the hydrolyzed copolymer was 99.5% by mole.

The hydrolyzed copolymer so prepared was molded in the same manner as in Example 1. The results were favorable as shown below.

Discoloration: None
Transparency: Very excellent
Surface smoothness: Excellent

Long run molding for 100 hours was carried out, but there was no trouble.

EXAMPLE 7

To 100 parts of a 40% methanol solution of ethylene-vinyl acetate copolymer having an ethylene content of 30% by mole, 10parts of a 10% methanol solution of sodium hydroxide was added, and hydrolysis reaction was carried out at a temperature of 40° C. for 3 hours with agitation. In the course of the hydrolysis reaction, the partially hydrolyzed copolymer precipitated and the reaction mixture changed viscous slurry. After the completion of the hydrolysis reaction, the slurry was neutralized with acetic acid and the precipitation of the particles was completed by adding 60 parts of methyl acetate to the slurry. Then the particles were separated by filtration. The wet particles so recovered contained 60% of volatile material.

The wet particles were dried at a temperature of 60° C. to reduce the content of volatile material to 7.0%, and the dried particles were passed through a 10-mesh sieve to remove coarse particles. The particles in an amount of 4.0% of whole particles were removed and the average particle size of the sieved particles was 350 μ. The degree of hydrolysis of the partially hydrolyzed copolymer so obtained was 96.0% by mole.

A hundred parts of the particles so obtained were added to 500 parts of a 1% aqueous solution of sodium hydroxide, and were further hydrolyzed at a temperature of 65° C. for 2.5 hours with agitation. After neutralizing the resulting reaction mixture with 7.5 parts of a 85% aqueous solution of orthophosphoric acid, the particles were separated by filtration. The separated particles were then washed by adding the particles to 500 parts of water, agitating at a room temperature for one hour and filtering the particles. This washing procedure was repeated twice.

The particles so washed were added to water in an amount by weight of 10times the particle to form a slurry, and orthophosphoric acid was added to the slurry in an amount of 0.16% based on the dry weight of the particle. The slurry was then agitated at a room temperature for 4 hours to treat the particles with orthophosphoric acid. After the completion of the phosphoric acid treatment, the particles were filtered and sufficiently dried in hot air. The orthophosphate radical content of the hydrolyzed copolymer so prepared was 0.017%, and the weight ratio of the phosphate radical to the sodium ion remaining in the particle was 4.1. Also, degree of hydrolysis of the hydrolyzed copolymer was 99.1% by mole.

The obtained hydrolyzed copolymer was molded in the same manner as in Example 1. The results are shown below.

Appearance
  Discloration: None
  Transparency: Very excellent
  Surface smoothness: Very excellent
Mechanical properties
  Tensile Strength (ASTM D 638): 960 kg./cm.$^2$
  Flexural strength (ASTM D 790): 1,240 kg./cm.$^2$
  Charpy impact strength (ASTM D 256): 7.4 kg.cm./cm.

Long run molding for 80 hours was carried out, but there was no trouble.

EXAMPLE 8

Ethylene-vinyl acetate copolymer having an ethylene content of 25% mole was hydrolyzed and treated with orthophosphoric acid in the same manner as in Example 7.

Degree of hydrolysis, volatile material content and average particle size of the partially hydrolyzed copolymer obtained by the primary hydrolysis in methanol were 96.5% by mole, 4.0% and 300 μ(average particle size of the portion passed through a 10-mesh sieve), respectively. Also, the degree of hydrolysis of the hydrolyzed copolymer obtained by the secondary hydrolysis in water was 99.3% by mole.

The properties of the hydrolyzed copolymer so prepared were favorable as shown below.

Discoloration: None
Surface smoothness: Excellent

Long run molding for 50 hours was carried out, but there was no trouble.

What we claim is:

1. A process for preparing hydrolyzed ethylene-vinyl acetate copolymers which comprises the steps of
   a. hydrolyzing an ethylene-vinly acetate copolymer having an ethylene content of 20 to 50% by mole in an alcoholic medium in the presence of an alkaline metal catalyst to produce particles of hydrolyzed copolymer having a degree of hydrolysis in vinyl acetate units of more than 90% by mole,
   b. separating said particles from the resulting hydrolysis reaction mixture and removing an alkali metal salt, wherein the alkali metal is selected from the group consisting of sodium and potassium which is included in the particles of the hydrolyzed copolymer to the extent that not more than 1.5% by weight based on the dry weight of the hydrolyzed copolymer of residual alkali metal salt remains in the copolymer,
   c. contacting the particles obtained by the step (b) with an aqueous or alcoholic solution of a phosphoric acid selected from the group consisting of orthophosphoric acid, phosphorous acid and pyrophosphoric acid to incorporate the phosphoric acid into the particles in an amount of 0,001 to 0.5% by weight of phosphorus-containing radical calculated as —$PO_4$ radical to the dry weight of the particles of the hydrolyzed copolymer and of not less than an equal amount of weight to the residual alkali metal ion of the salt in the particles of the hydrolyzed copolymer, d. separating the particles of the hydrolyzed copolymer from the mixture, and e. drying the particles of the hydrolyzed copolymer.

2. The process of claim 1, in which an acid is added to the hydrolysis reaction mixture to neutralize the alkali before separating the particles from said reaction mixture.

3. The process of claim 1, wherein the hydrolysis in said step (a) is carried out in an alcoholic medium until a degree of hydrolysis reaches the range of 90 to 97% by mole (primary hydrolysis), and then is carried out in a water medium to a degree of hydrolysis of more than 97% by mole (secondary hydrolysis).

4. The process of claim 3, in which an acid is added to the reaction mixture obtained in said secondary hydrolysis to neutralize the alkali.

5. The process of claim 3, wherein the particle size of the hydrolyzed copolymer used in said secondary hydrolysis is in the range of less than 2,000 $\mu$.

6. The process of claim 3, wherein the alcohol content of the particles used in the secondary hydrolysis is reduced to less than 15% by weight.

* * * * *